June 28, 1966  I. CARLSON  3,257,789
CUTTER BAR HINGED EXTENSION
Filed Nov. 6, 1964  3 Sheets-Sheet 1
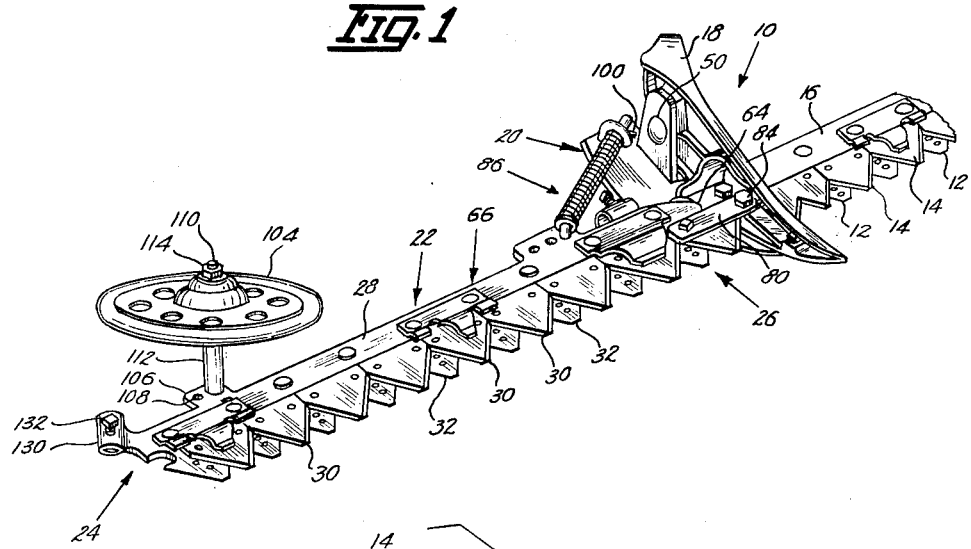
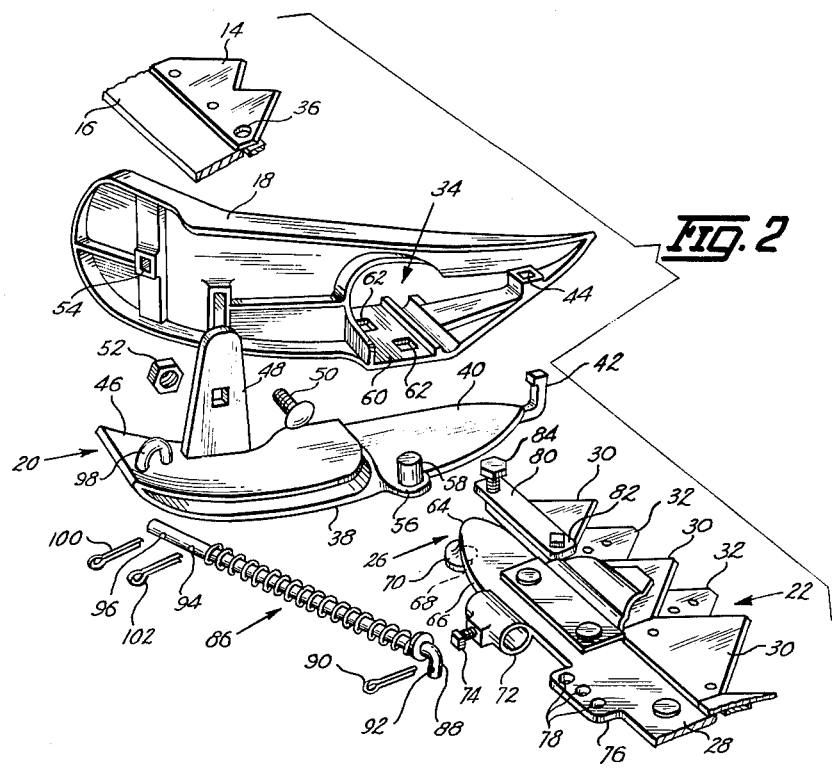
INVENTOR.
IVYL CARLSON
BY Morton S. Adler
ATTORNEY.

June 28, 1966  I. CARLSON  3,257,789
CUTTER BAR HINGED EXTENSION
Filed Nov. 6, 1964  3 Sheets-Sheet 2
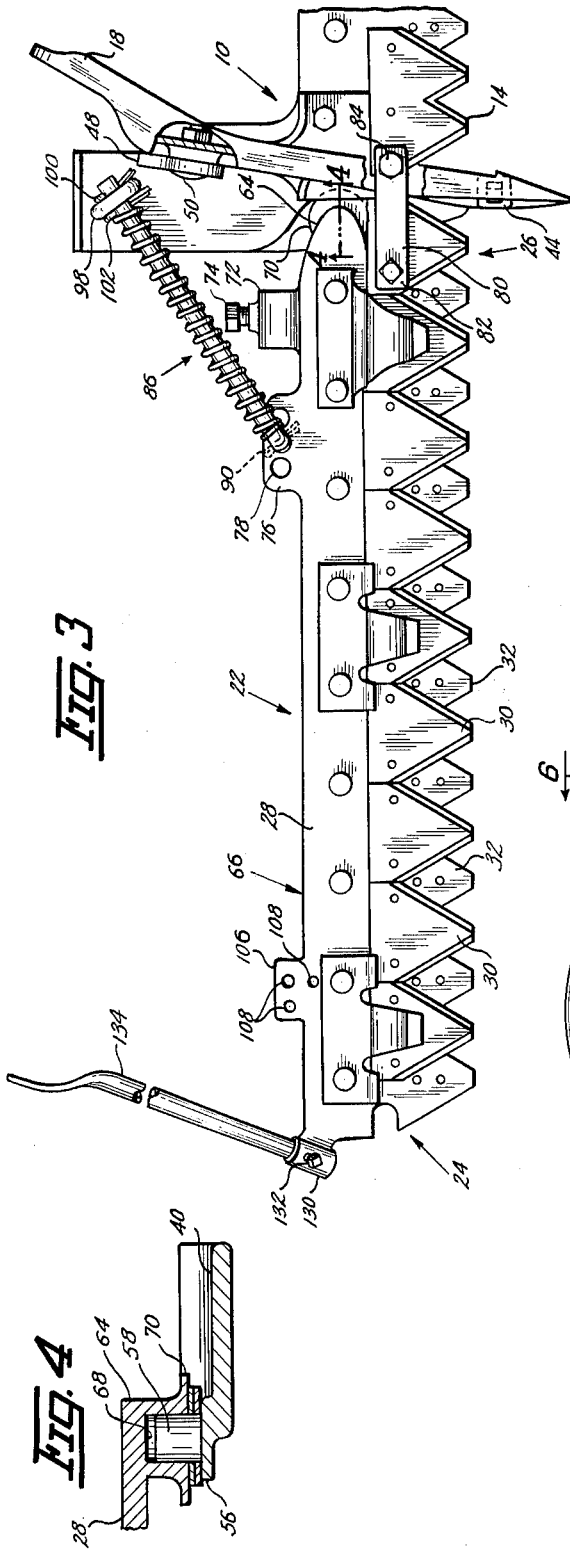
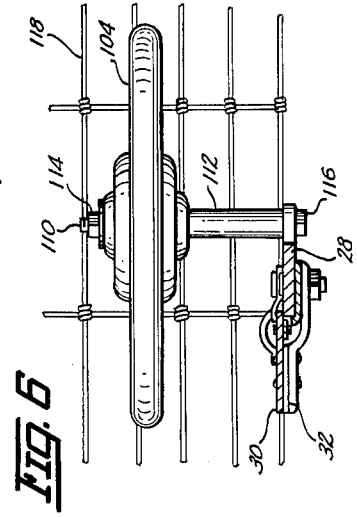
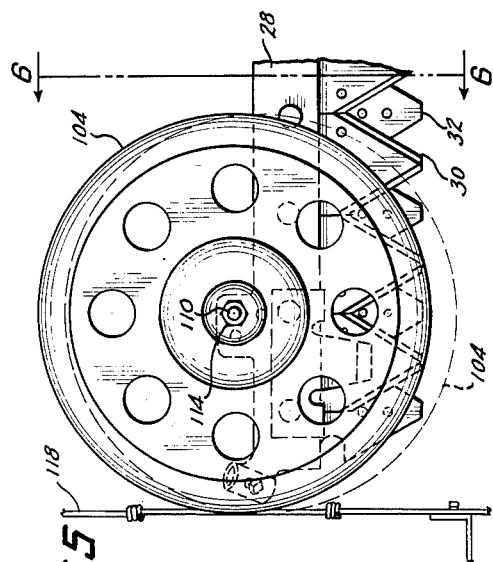
INVENTOR.
IVYL CARLSON
BY Morton S. Adler
ATTORNEY.

June 28, 1966  I. CARLSON  3,257,789
CUTTER BAR HINGED EXTENSION
Filed Nov. 6, 1964  3 Sheets-Sheet 3
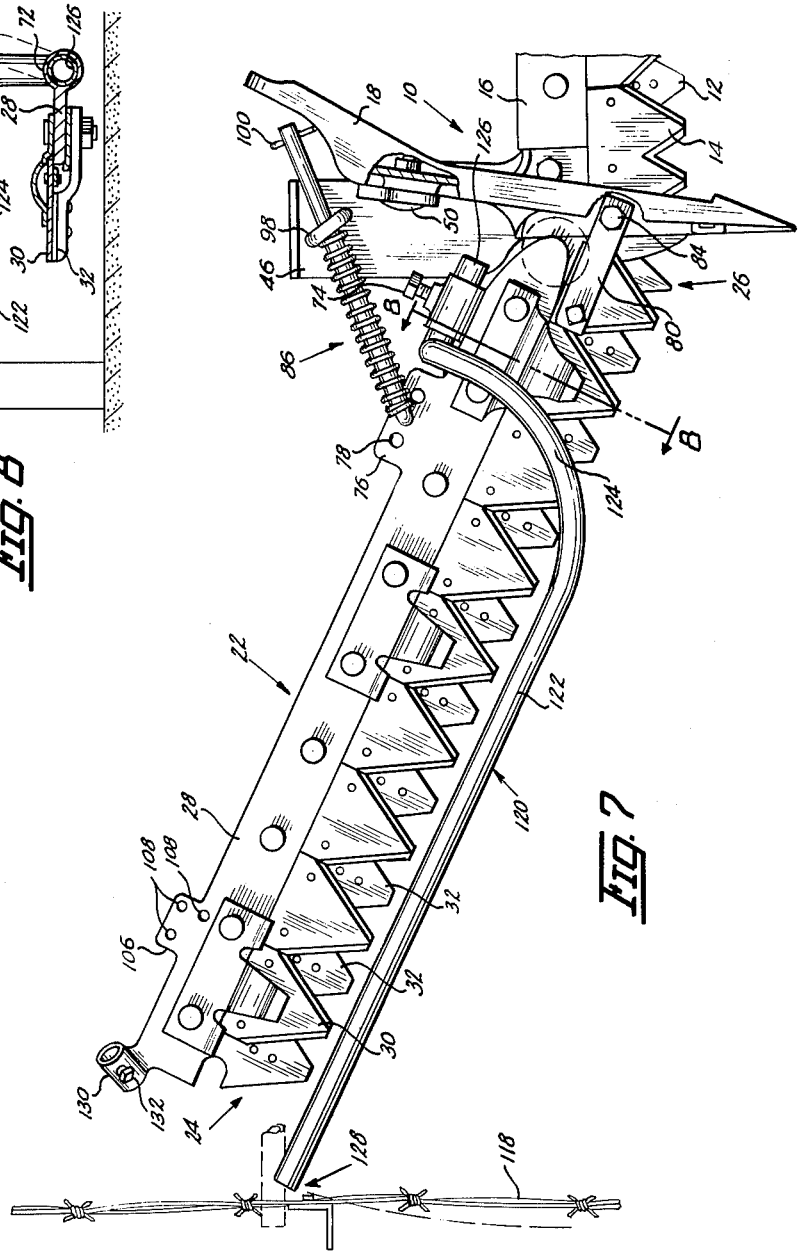
INVENTOR.
IVYL CARLSON
BY Morton S. Adler
ATTORNEY.

United States Patent Office 3,257,789
Patented June 28, 1966

3,257,789
CUTTER BAR HINGED EXTENSION
Ivyl Carlson, Rte. 2, Madrid, Iowa
Filed Nov. 6, 1964, Ser. No. 409,379
11 Claims. (Cl. 56—296)

This invention relates to improvements in power-driven sickle bar mowing apparatus and more particularly to a novel sickle or cutter bar hinged extension unit.

One of the important objects contemplated by the present invention is the provision of a sickle bar extension unit of preferably two feet in length that can be quickly and easily attached to the shoe of a sickle bar assembly.

Another important object is to provide such an extension with a spring-loaded hinged attachment to the end of the sickle bar assembly so that it will yield and swing back upon striking any unyielding obstruction.

Still a further object is to provide a sickle bar extension of the above class that includes a reciprocating shearing action comparable to the main sickle bar and which cannot only be quickly and easily connected to the main sickle bar for operation thereby but which continues in operating or shearing action either in a swingback position or in a position of longitudinal alignment with the main bar. In this latter regard, this extension unit permits uninterrupted cutting action around obstacles such as trees, fence posts, etc., and differs materially from most present type sickle bars mowing machines which, in those models that provide a swingback action for the main sickle bar itself, are generally constructed to interrupt the cutting action when in the swingback position.

Another important feature of this invention resides in the provision of a guard or bumper wheel on the outer end of the sickle bar extension for movable engagement with a fence line, fence post or the like whereby the shearing action can continue uninterruptedly as the mower moves in close proximity to such objects.

A further object includes the provision of locking the extension unit against any hinging movement if desired.

Still another object is to provide an adjustable bumper extending across the front of the cutting teeth on this extension unit and extending beyond the outer end thereof to protect such unit from damage from unyielding obstacles and to provide a guard means to permit operation closely adjacent a fence line.

To attain these objects and such further objects as may appear herein, or be hereinafter pointed out, reference is made to the accompanying drawings forming a part hereof, in which:

FIG. 1 is a perspective view of this invention shown attached to the shoe of a sickle bar and equipped with the novel bumper wheel, FIG. 2 is an enlarged exploded view showing the inner end of this extension unit with the related sickle bar shoe to which it is attached, FIG. 3 is a top view of this invention shown locked against any swingback movement for use as a mere cutter bar extension away from fence lines, FIG. 4 is a cross sectional view taken on the line 4—4 of FIG. 3, FIG. 5 is a top view of the bumper wheel, FIG. 6 is an elevational view taken from the line 6—6 of FIG. 5, FIG. 7 is a top view of this invention equipped with the front bumper bar and shown in a swingback position adjacent a fence line, and FIG. 8 is a cross sectional view taken on the line 8—8 of FIG. 7.

Referring to the drawings, the outer end portion of a more or less conventional sickle bar is designated generally by the numeral 10 (FIG. 1) and includes the stationary shearing fingers 12 which cooperate for cutting action with the reciprocal teeth units 14. Fingers 12 are secured to the underside of bar 16 and teeth 14 are mounted for reciprocation in a well known manner relative to the top side of bar 16 and the top surface of fingers 12. The normal outer end of bar 16 carries a shoe 18 that customarily rides upon a detachable slide or skid member in a well known manner but which is not shown as it is replaced by the slide or skid 20 (FIG. 2) for purposes of this invention which will later be referred to in detail. No invention is claimed in the sickle bar structure 10 and it will be understood that bar 16 at its inner end (not shown) is operatively associated with a tractor or the like for reciprocal movement of teeth 14 in a well known manner.

My new an improved cutter bar extension unit is designated generally by the numeral 22 and for purposes of description includes the outer end 24 and the inner end 26. It is in all respects to its cutting action similar in construction to the main sickle bar 10 to which it is attached, and accordingly it will be understood that bar 28 carries the spaced teeth 30 which are susceptible of reciprocation relative to the stationary shear fingers 32. Fingers 32 are secured to the underside of bar 28 so that bars 16 and 28 are similar in construction and function similarly the same as do teeth 14 and 30 and fingers 12 and 32. This particular feature of reciprocal action is well known and no invention is claimed thereto per se.

In order to adapt the sickle bar 10 for receiving extension unit 22, the tooth unit 14 (FIG. 2) replaces the usual tooth unit on the outer end of bar 10 which is normally disposed within the cut out section 34 of shoe 18 with the only difference being in the provision of the hole 36 and this can be a permanent replacement. The customary slide or skid (not shown) for shoe 18 is replaced by the slide or skid 20 with the arcuate bottom 38. The forward portion 40 of slide 20 terminates in an upstanding hook 42 designed for removable engagement in the customary socket 44 on shoe 18 and the rear portion 46 of slide 20 carries the upstanding apertured bearing member 48 which is removably secured to shoe 18 by means of the bolt 50 and nut 52 secured through hole 54. In this regard, it is pointed out that socket 44 and hole 54 in shoe 18 are a part of its normal construction to which the customary simple shoe (not shown) is attached and I have adapted my new slide 20 to utilize these features. Slide 20 will thus be disposed beneath shoe 18 and as best seen in FIG. 2, an ear 56 projects from the rearward portion of slide portion 40 on its outer side or in other words towards that side adjacent the extension unit 22 and such ear 56 carries an upstanding boss or pivot post 58. Thus far described, the tooth 14 modified by the addition of hole 36 and the redesigned slide 20 are the only changes required in the sickle bar assembly 10 for the purpose of accommodating my new extension unit 22.

It will be noted in the construction of slide 20 (FIG. 2) that the forward portion 40 is off-set relative to a horizontal plane with the top surface of the rear portion 46 whereby portion 40 is on a lower plane or level and thus when attached to shoe 18 as described, there will be a spaced relationship between portion 40 and the channel portion 60 of shoe 18. This allows room for bolts (not shown) which secure the outer end of bar 16 in channel 60 through the holes 62 and also provides room for attachment and operation of unit 22 as follows.

The inner end 26 of bar 28 preferably has tapered sides to provide a pointed blunt end 64 and on the back edge 66 of bar 28 and spaced somewhat inwardly from point 64, there is a depending socket member 68 which as seen in FIG. 2 partially projects exteriorly of bar 28 to form a lip 70. Also on edge 66 of bar 28 there is secured a tubular support member 72 with a set screw 74 and a projecting shoulder 76 that is provided with a plurality of spaced holes 78 for purposes that will be referred to later. A rigid bar link 80 is pivotally secured at one end 82 to one side of the end tooth 30 at the inner end of bar 28 and is of sufficient length to extend across such tooth and project therefrom relative to bar end 26. Thus, with end 26 of extension unit 22 constructed as described, such extension is attachable to unit 10 in the following manner.

Socket 68 is slip fitted over the pivot post 58 for pivotal movement thereon, it being understood that ear 56 to which post 58 is mounted is laterally off-set from the outer edge of channel 60 on shoe 18 and bar end 64 will extend intermediate the bottom of channel 60 and slide portion 40. The free end of link 80 is provided with a bolt means 84 for pivotal connection with hole 36 in the end tooth 14 of bar 16 and thus far described, it will be appreciated that not only is unit 22 pivotable or hingable on post 58 relative to unit 10 but that any force for reciprocating teeth 14 is transmitted through link 80 to teeth 30 and this force is continuous whether unit 22 is longitudinally aligned with unit 10 or off-set relative to such alignment.

It is intended that unit 22 normally be maintained in alignment with unit 10 but be capable of pivotal movement to a swingback position as shown in FIG. 7 if an obstruction is encountered, and for this purpose a spring loaded rod member 86 connects unit 22 to slide 20 as follows. One end of rod 86 is bent to form a hook 88 which can be selectively inserted through one of the holes 78 in bar 28 and removably locked in place by a cotter pin 90 inserted through the hole 92. The other end of rod 86 is provided with two longitudinally spaced holes 94 and 96 and such end is inserted through an arched keeper 98 on the rear portion of slide portion 46 so that holes 94 and 96 are on opposite side of the keeper. With a cotter pin 100 through hole 96 on the far side of keeper 98 relative to unit 22, it will be seen that such unit can yieldingly move against the spring on rod 86 to a swingback position as seen in FIG. 7 from which it will automatically return when the obstruction is cleared. To lock unit 22 against pivotal movement which may be desired in a straight mowing operation, pin 102 is inserted through hole 94 so that pins 100 and 102 are on opposite sides of keeper 98 as shown in FIG. 3.

In the mounting of extension 22 to assembly 10 as described, the end 64 of bar 28 will be positioned below channel 60 of shoe 18 when unit 22 is longitudinally aligned with assembly 10 and will abut such channel to keep socket 68 from bouncing off of the post 58. Such end 64, however, will tend to rotate out from under such channel as unit 22 moves to the swingback position (FIG. 7), and as this occurs, lip 70 will move beneath the channel 60 to abut the channel to serve in the same manner as end 64 as a holding or locking means against displacement of sockets 68 from post 58.

One of the novel features of extension unit 22 resides in the provision of a bumper wheel 104 at the outer end portion 24 of bar 28. For this portion an integral projecting plate 106 is located on the rear edge 66 of bar 28 near but not at end 24 and is provided with a plurality of spaced holes 108 through any one of which is mounted a vertical shaft or axle 110. Wheel 104 is rotatably mounted on axle 110 above a suitable spacer sleeve 112 (FIG. 6) and nuts 114 and 116 are affixed to the respective top and bottom ends of axle 110 for obvious reasons. The length of sleeve 112 may be varied to regulate the vertical height of wheel 104 and its relative position to a fence line 118. Wheel 104 may be mounted relative to different holes 108 so as to adjust its degree of overhang relative to end 24 of bar 28 (FIG. 5) and thus positioned, such wheel will roll around an obstruction such as a fence post as unit 22 moves to a swingback position so that end 24 is kept free from entanglement in the fence 118 or the like. Such wheel also tends to push cut material around extension end 24 to the rear thereof and, as indicated above, at all times, the shearing or cutting action of unit 22 is uninterrupted irrespective of the position of such unit relative to assembly 10.

An alternative bumper guard 120 is provided in the form of an elongated rod 122 curved at one end 124 and terminating in an angularly projecting stub shaft 126 that is rotatably journalled in bumper support 72. The main length of rod 122 extends transversely of the cutting edge of teeth 30 and shearing fingers 32 and extends to point 128 outwardly from end 24 of bar 28 where it can slide against the fence 118 as best seen in FIG. 8. By means of the set screw 74, rod 122 can be vertically adjusted as desired.

The outer end 24 of bar 28 is provided with the rod holding member 130 having a set screw 132 for supporting the conventional dividing rod 134 that is customarily carried at the outer end of a sickle bar apparatus for well known purposes.

It will be appreciated from the foregoing description that extension unit 22 requires only the two bolts 50 and 84 for quick and easy attachment to or removal from assembly 10 an thus provides a most efficient means of adding a suitable extension to any sickle bar mowing apparatus. Such extension can be maintained rigid or hingable with a minimum of adjustment and the improved guard means in the form of wheel 104 and bumper 120 not only protect the cutting teeth but prevent the cutter bar from becoming entangled in fence lines. The uninterrupted cutting action of unit 22 while moving to and from a swingback position and while in the swingback position provides many advantages over other cutter bars presently in use. It is thus thought from the foregoing that a full understanding of the construction and operation of this invention will be had and the advantages of the same will be appreciated.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. In a sickle bar mowing apparatus including an elongated bar assembly having reciprocal teeth members, said bar assembly being designed for operative attachment to a tractor or the like, the combination therewith of a sickle bar extension unit comprising:

an elongated bar member, a plurality of teeth on said bar member capable of being reciprocated, linkage means detachably connecting one end of said plurality of teeth to said bar assembly and in longitudinal alignment therewith so that reciprocal motion of the teeth members on said bar assembly when in operation is transmitted to said plurality of teeth, and means yieldingly and removably connecting one end of said bar member to said bar assembly to permit a swingback action by said bar member in a direction rearwardly relative to the forward movement of the tractor when encountering an unyielding obstacle.

2. A device as defined in claim 1 wherein said linkage means is movable so that reciprocation of said teeth is continuous when said bar member is in a swingback position.

3. A device as defined in claim 1 including wheel means rotatable about a vertical axis and mounted on the free end of said bar member to serve as a bumper means.

4. In a sickle bar mowing apparatus including an elongated bar assembly having reciprocal teeth members, said bar assembly being designed for operative attachment to a tractor or the like, and said bar assembly including a shoe at its outer end, the combination therewith of a sickle bar extension unit comprising:
  an elongated bar member,
  a plurality of teeth on said bar member capable of being reciprocated,
  linkage means connecting said teeth to said bar assembly so that reciprocal motion of the teeth members on said bar assembly when in operation is transmitted to said teeth,
  a slide removably connected to said shoe,
  spring loaded means connecting said bar member to said slide to permit a swingback action by said bar member when encountering an unyielding obstacle, and
  means to convert said spring loaded means into a rigid connection to prevent any swingback action by said bar member.

5. A device as defined in claim 1 including; a bumper guard adjustably secured to one end of said bar member and extending parallel therewith to the other end in front of said teeth.

6. In a sickle bar mowing apparatus including an elongated bar assembly having reciprocal teeth members, said bar assembly being designed for operative attachment to a tractor or the like, the combination therewith of a sickle bar extension unit comprising:
  a sickle bar extension including teeth capable of being reciprocated,
  linkage means connecting one end of said sickle bar extension to one end of said bar assembly and in longitudinal alignment therewith so that reciprocal motion of the teeth members of said bar assembly when in operation is transmitted to the teeth on said sickle bar extension,
  means hingedly connecting said sickle bar extension to said bar assembly to permit a swingback movement by said sickle bar extension in a direction rearwardly relative to the forward movement of the tractor when encountering an unyielding object, and
  said linkage means being movable so that reciprocation of the teeth on said sickle bar extension is continuous when the sickle bar extension is in a swingback position.

7. A device as defined in claim 6 including wheel means rotatable about a vertical axis and mounted on the free end of said sickle bar extension.

8. In a sickle bar mowing apparatus including an elongated bar assembly having reciprocal teeth members, said bar assembly being designed for operative attachment to a tractor or the like, and said bar assembly including a shoe at its outer end, the combination therewith of a sickle bar extension unit comprising:
  an elongated bar member having an inner and outer end respectively,
  a plurality of teeth on said bar member capable of being reciprocated,
  a slide removably connected to the underside of said shoe,
  an upstanding pivot post on said slide disposed exteriorly of said shoe,
  a depending socket on said bar member spaced inwardly from said inner end,
  a lip on said socket projecting exteriorly of said bar member,
  said socket being slip fitted on said post for pivotal movement relative thereto,
  said inner end extending intermediate said slide and said shoe when said bar member is longitudinally aligned with said bar assembly to prevent displacement of said socket,
  linkage means connecting said teeth to said bar assembly so that reciprocal motion of the teeth members on said bar assembly is transmitted to said teeth,
  spring loaded means connecting said bar member to said slide to permit a swingback action, and
  said lip moving intermediate said slide and said shoe during such swingback action to prevent displacement of said socket from said post.

9. In a sickle bar mowing apparatus including an elongated bar assembly having reciprocal teeth members, said bar assembly being designed for operative attachment to a tractor or the like, and said bar assembly including a shoe at its outer end, the combination therewith of a sickle bar extension unit comprising:
  an elongated bar member having an inner and outer end respectively,
  a plurality of teeth on said bar member capable of being reciprocated,
  a slide removably connected to the underside of said shoe,
  an upstanding pivot post on said slide disposed exteriorly of said shoe,
  a depending socket on said bar member spaced inwardly from said inner end,
  a lip on said socket projecting exteriorly of said bar member,
  said socket being slip fitted on said post for pivotal movement relative thereto,
  linkage means connecting said teeth to said bar assembly so that reciprocal motion of the teeth members on said bar assembly is transmitted to said teeth,
  spring loaded means connecting said bar member to said slide to permit a swingback action, and
  said lip moving intermediate said slide and said shoe during such swingback action to prevent displacement of said socket from said post.

10. A device as defined in claim 9 including means to convert said spring loaded means into a rigid connection to prevent any swingback action by said bar member.

11. A device as defined in claim 9 wherein said linkage means is movable so that reciprocation of said teeth is continuous when said bar member is in a swingback position.

References Cited by the Examiner

UNITED STATES PATENTS

| | | | |
|---|---|---|---|
| 132,513 | 10/1872 | Laughlin et al. | 56—316 |
| 202,269 | 4/1878 | Kelly | 56—316 X |
| 2,791,081 | 5/1957 | Allen et al. | 56—25.4 |
| 2,957,296 | 10/1960 | Waters | 56—220 |

ANTONIO F. GUIDA, *Acting Primary Examiner.*

RUSSELL R. KINSEY, *Examiner.*

M. C. PAYDEN, *Assistant Examiner.*